United States Patent
Scharf (10) Patent No.: US 9,708,555 B2
(45) Date of Patent: Jul. 18, 2017

(54) COMBUSTIBLE GAS COMPOSITION

(75) Inventor: Joerg Scharf, Bautzen (DE)

(73) Assignee: NARWA TECHNOLOGIES AG (CH)

( * ) Notice: Subject to any disclaimer, the term of this patent is extended or adjusted under 35 U.S.C. 154(b) by 811 days.

(21) Appl. No.: 13/996,250

(22) PCT Filed: Nov. 30, 2011

(86) PCT No.: PCT/EP2011/006002
§ 371 (c)(1),
(2), (4) Date: Aug. 12, 2013

(87) PCT Pub. No.: WO2012/084119
PCT Pub. Date: Jun. 28, 2012

(65) Prior Publication Data
US 2013/0312327 A1    Nov. 28, 2013

(30) Foreign Application Priority Data

Dec. 20, 2010 (EP) .................................. 10015833

(51) Int. Cl.
*C10L 3/00* (2006.01)
*C25B 1/04* (2006.01)

(52) U.S. Cl.
CPC ............... *C10L 3/003* (2013.01); *C25B 1/04* (2013.01); *Y02E 60/366* (2013.01)

(58) Field of Classification Search
CPC ..................................... B01J 7/00; C10L 3/00
See application file for complete search history.

(56) References Cited

U.S. PATENT DOCUMENTS

| 6,372,100 B1* | 4/2002 | Lin ........................... B01J 7/02 204/270 |
| 2009/0166191 A1 | 7/2009 | Sato et al. |
| 2009/0194421 A1 | 8/2009 | Sato et al. |
| 2012/0037510 A1* | 2/2012 | Bethurem ............. C10G 32/02 205/462 |

FOREIGN PATENT DOCUMENTS

| EP | 2465915 | 6/2012 |
| JP | 53-112906 | 10/1978 |
| WO | 2009104070 | 8/2009 |
| WO | 2010101261 | 9/2010 |
| WO | 2012084119 | 6/2012 |

OTHER PUBLICATIONS

International Search Report dated Mar. 20, 2012 issued in corresponding Application No. PCT/EP2011/006002.

* cited by examiner

*Primary Examiner* — Ellen McAvoy
*Assistant Examiner* — Ming Cheung Po
(74) *Attorney, Agent, or Firm* — Onello & Mello, LLP (57) ABSTRACT

The present invention provides a method and a system for synthesizing a combustible gas composition as well as a combustible gas composition obtained by such a method. In particular, the method comprises providing a primary gas (30) obtained by splitting water (12) by means of an electric field; and mixing the primary gas (30) with a secondary gas (44) and with air, wherein the secondary gas (44) comprises a combustible gaseous hydrocarbon.

7 Claims, 4 Drawing Sheets

COMBUSTIBLE GAS COMPOSITION

The present invention refers to a combustible gas composition as well as a method and a system for synthesizing the combustible gas composition.

Fossil fuels have played a mayor role in energy supply for many decades. In particular, many applications rely on mineral oil or natural gas as sources of energy in view of their favorable properties with regards to energy content and the suitability for storage. However, the finite available reserves of fossil fuels as well as the environmental pollution caused by the combustion gases, which result when fossil fuels are burned, make alternative energy sources highly desirable. In the last decades many effort has been made in the field of renewable energy, such as biogas or in solar energy, wind energy, water energy etc. One of the mayor challenges, however, is how to efficiently store the energy in a safe manner. While some of the investigated approaches, such as electrical storage in batteries, are quite expensive and unwieldy, other approaches, such as elementary hydrogen are technically difficult and rather dangerous to handle.

Therefore, according to one aspect, it is an object of the invention to provide an efficient source of energy, which is easy to handle, to store and to flexibly apply. This object is solved by a method and a system as well as a combustible gas composition obtained therewith, in accordance with the inventive concept.

Accordingly, in one aspect the invention provides a method for synthesizing a combustible gas composition. This method comprises providing a first gas component (in the following called "a primary gas") obtained by splitting water by means of an electric field, i.e. electrolyzing water. In particular, the primary gas is provided as the overall gaseous product of the process of electrolyzing water, i.e. the primary gas itself is a composition of all gaseous components obtained by electrolyzing water. This particularly means that all gaseous components obtained by an electrolyzing process are collected to constitute the primary gas, wherein the electrolyzing process is performed by providing two electrode arrangements in a water bath and applying an electric current to the water bath via the two electrode arrangements. Thus, the step of providing the primary gas may comprise electrolyzing water to generate the primary gas. Alternatively, the primary gas may be provided from a storage of primary gas obtained from a previous electrolyzing process.

The primary gas is then mixed with a second gas component (in the following called "a secondary gas") and with air (as a third gas component), wherein the secondary gas comprises a combustible gaseous hydrocarbon. The secondary gas may substantially consist of a combustible gaseous hydrocarbon. Preferably, the secondary gas comprises methane and/or ethane and/or propane and/or butane. Vaporized components of volatile liquids (gasoline) may also be used as secondary gas.

Preferably, the air mixed with the primary and secondary gas is provided as ambient air with its known composition of about 78 percent nitrogen, about 21 percent oxygen, and about 1 percent other gaseous components (e.g. argon, carbon dioxide, etc.).

The primary gas, the secondary gas and the air are mixed with a ratio of $x_p:x_s:x_a$, wherein $x_p$ (share of primary gas) is in the range of about 0.02 to about 0.06, $x_s$ (share of secondary gas) is in the range of about 0.01 to about 0.04, and $x_a$ (share of air) is in the range of about 0.9 to about 0.97. In particular, this ratio is defined as a ratio of volume at normal condition, i.e. at the equal pressure and temperature. For the preferred values of $x_p$, $x_s$, and $x_a$, it is further preferred, but not essential, that $x_p+x_s+x_a=1$. Most preferably, the ratio $x_s:x_p$ is in the range of about 0.5 to about 1.2, wherein in one aspect it is most preferable that the ratio $x_s:x_p$ is in the range of about 0.5 to about 1. This is particularly preferred for applying the synthesized combustible gas composition in combustion engines. In another aspect it is most preferable that the ratio $x_s:x_p$ is in the range of about 0.6 to about 1.2. This is particularly preferred for applying the synthesized combustible gas composition in heating systems or for gas burners in an absorber cooling system, for example. In a particularly preferred embodiment the ratio $x_s:x_p$ is in the range of about 0.6 to about 0.8, which is very efficient for many applications. According to one preferred example, the ratio $x_p:x_s:x_a$ is about 0.05:0.03:0.92.

Thus, a combustible gas composition is provided with a high fuel value, which is secure to handle, to store and to apply for combustion even in closed rooms.

Preferably, mixing the primary gas with the secondary gas and with air comprises providing a mixing chamber partly filled with water; providing the primary gas in the water within the mixing chamber; and feeding (blowing) the air into the mixing chamber in the room above the water. The secondary gas may be provided in the water within the mixing chamber (e.g. together with the primary gas, or separately) or it may be fed (blown) into the mixing chamber in the room above the water (e.g. together with the air). In another embodiment, all three components (primary gas, secondary gas, and air) may be provided in the water within the mixing chamber. Although it is not necessary that one of the gas components is provided in water, it is particularly preferred to provide at least the primary gas in the water within the mixing chamber. In this case the water serves for cooling the primary gas. Moreover, the water securely prevents a flashback in case of an unintentional ignition of the primary gas in the mixing chamber 10.

Preferably, providing the primary gas in the water within the mixing chamber comprises feeding (blowing) the primary gas from outside the mixing chamber into the water inside the mixing chamber via a primary feeding pipe, which is at least partly arranged in the water inside the mixing chamber. In this example, the primary gas is generated outside the mixing chamber and is then transferred into the mixing chamber.

In this example, the method preferably comprises discharging water from the mixing chamber into an electrolyzing chamber, wherein the primary gas is generated by electrolyzing the water inside the electrolyzing chamber. The generated primary gas is subsequently piped (transferred) from the electrolyzing chamber into the mixing chamber. Preferably, the primary gas flows from the electrolyzing chamber into the mixing chamber due to a pressure difference, i.e. a higher pressure in the electrolyzing chamber than in the mixing chamber. Preferably, the water is pumped from the mixing chamber into the electrolyzing chamber.

In one example, providing the primary gas in the water within the mixing chamber preferably comprises bringing the primary gas and the secondary gas together outside the mixing chamber; and feeding (blowing) the primary gas together with the secondary gas from outside the mixing chamber into the water inside the mixing chamber via a feeding pipe, such as the primary feeding pipe. In another example, feeding the air into the mixing chamber in the room above the water comprises bringing the secondary gas and the air together outside the mixing chamber; and feeding (blowing) the secondary gas together with the air from outside the mixing chamber into the mixing chamber in the room above the water via a feeding pipe.

In another preferred embodiment, the primary gas is generated by electrolyzing the water inside the mixing chamber. In particular, it is preferred that the electrolyzing process is performed inside the mixing chamber. This allows to synthesize the combustible gas composition in a very compact system. On the other hand, electrolyzing the water in a separate electrolyzing chamber allows to optimize the electric field geometry for a more efficient splitting of the water with lower loss of electric power.

Preferably, providing the secondary gas in the water within the mixing chamber comprises feeding (blowing) the secondary gas from outside the mixing chamber into the water inside the mixing chamber via a secondary feeding pipe arranged in the water inside the mixing chamber.

Preferably, the water is electrolyzed by applying a direct current (DC) to electrodes arranged in the water. In particular, a DC voltage in the range of from about 1V to about 30V is preferred. Preferably, the method comprises adding an electrolyte, such as sodium carbonate, to the water, which is electrolyzed for generating the primary gas. Preferably, the concentration of the electrolyte is in the range of about 1 to about 2 percent of weight.

In one aspect, the invention provides a combustible gas composition obtained by a method according to the invention. Preferably, a combustible gas composition is obtained by one of the preferred embodiments of a method as described herein. Most preferably, a combustible gas composition according the invention is obtained with one of the systems according to the invention as described herein.

In a further aspect, the invention provides a system for synthesizing a combustible gas composition. The system comprises an electrolyzer (electrolysis module) for electrolyzing water to generate a primary gas. Analogous to the above description, the primary gas is the overall gaseous product of the process of electrolyzing water, i.e. the primary gas itself is a composition of all gaseous components obtained by electrolyzing water. Moreover, the system further comprises a mixing chamber adapted for mixing the primary gas with a secondary gas and with air, wherein the secondary gas comprises a combustible gaseous hydrocarbon. For this the system comprises a gas supply line (e.g. secondary supply line) for feeding the combustible gaseous hydrocarbon as at least part of the secondary gas into the mixing chamber. Moreover, the system further comprises an air supply line for feeding the air into the mixing chamber. Preferably, the mixing chamber is adapted to accommodate water.

In one preferred embodiment the electrolyzer may be at least partly arranged inside the mixing chamber, wherein the mixing chamber is adapted to accommodate the water. In particular, the electrolyzer comprises electrodes that are arranged inside the mixing chamber for electrolyzing the water accommodated in the mixing chamber.

In another preferred embodiment, the electrolyzer comprises an electrolyzing chamber for electrolyzing water to generate the primary gas. The electrolyzing chamber may be provided as a separate chamber in addition to the mixing chamber. More preferably, the system is adapted to discharge water from the mixing chamber into the electrolyzing chamber. The electrolyzer comprises electrodes arranged in the electrolyzing chamber. Electrolyzing current is supplied to the electrodes from a power supply. Preferably, the system further comprises a primary supply line for feeding the primary gas from the electrolyzing chamber to the mixing chamber.

Preferably, the electrolyzer comprises at least two main electrodes that are electrically connected to the power supply and at least one auxiliary electrode, preferably a plurality of auxiliary electrodes, arranged between the main electrodes, wherein the at least one auxiliary electrode is not electrically connected to a power supply. The auxiliary electrodes serve for conditioning the electric field, particularly to reduce unintentional stray fields at the edge of the electrode configuration, thereby improving the efficiency of the electrolyzing process to generate the primary gas.

As already mentioned, the mixing chamber is preferably adapted to be at least partly filled with water, i.e. the mixing chamber is preferably adapted to accommodate water. Preferably, the system further comprises a primary feeding pipe for feeding the primary gas from outside the mixing chamber into the water inside the mixing chamber. Alternatively or additionally, the system preferably comprises a secondary feeding pipe for feeding the secondary gas from outside the mixing chamber into the water inside the mixing chamber. In a preferred embodiment both the primary and the secondary feeding pipe are provided, i.e. they are provided as separate components. In another preferred embodiment a combined component with a feeding pipe for feeding both the primary and the secondary gas from outside the mixing chamber into the water inside the mixing chamber is provided. In this case, the primary and the secondary gas are already brought together outside the mixing chamber.

Alternatively or additionally, the system further comprises an air feeding pipe (48) for feeding the air from outside the mixing chamber into the mixing chamber. In particular, pressurized air may be pumped into the mixing chamber via the air feeding pipe. In a preferred embodiment, the air feeding pipe may be arranged in the mixing chamber so as to allow feeding of the air into the water inside the mixing chamber. In another embodiment, the air feeding pipe may be arranged in the mixing chamber so as to allow feeding of the air into a mixing volume in the mixing chamber above the water accommodated in the mixing chamber.

Additionally or alternatively, the system preferably comprises an air feeding pipe for feeding the air from outside the mixing chamber the mixing chamber. In a preferred embodiment the air feeding pipe is arranged for dispersion of the air in a region inside the mixing chamber above the water contained in the mixing chamber.

Most preferably, the mixing chamber is adapted for accommodating water up to as least a preferred filling level in a vertical direction of the mixing chamber. Preferably, a longitudinal direction (length extension) of the primary feeding pipe and/or the secondary feeding pipe and/or the air feeding pipe extends substantially in a horizontal direction of the mixing chamber, i.e. substantially parallel to a water surface of the water filled into the mixing chamber. Preferably, the air feeding pipe is arranged above the primary and/or the secondary feeding pipe, wherein "above" is to be understood in the vertical direction of the mixing chamber. Preferably, the primary feeding pipe and/or the secondary feeding pipe is arranged below the preferred filling level, while the air feeding pipe may be arranged below the preferred filling level or above the preferred filling level.

Preferably, the primary feeding pipe and/or the secondary feeding pipe and/or the air feeding pipe comprises a plurality of dispersion holes. This ensures an efficient mixing of the gas components for the synthesis of the combustible gas composition according to a preferred embodiment of the invention.

Preferably, the system further comprises a compressor for discharging the synthesized gas from a mixing volume of the mixing chamber. Alternatively or additionally, the system comprises a water inlet for supplying water to the electrolyzer and/or the mixing chamber. Thereby, even when water is consumed by the electrolysis, a constant water level can be maintained and the gas synthesis can be conducted continuously.

More details of the invention will be apparent from further examples of possible implementations as explained with reference to the drawings in the following, wherein.

Figure 1:
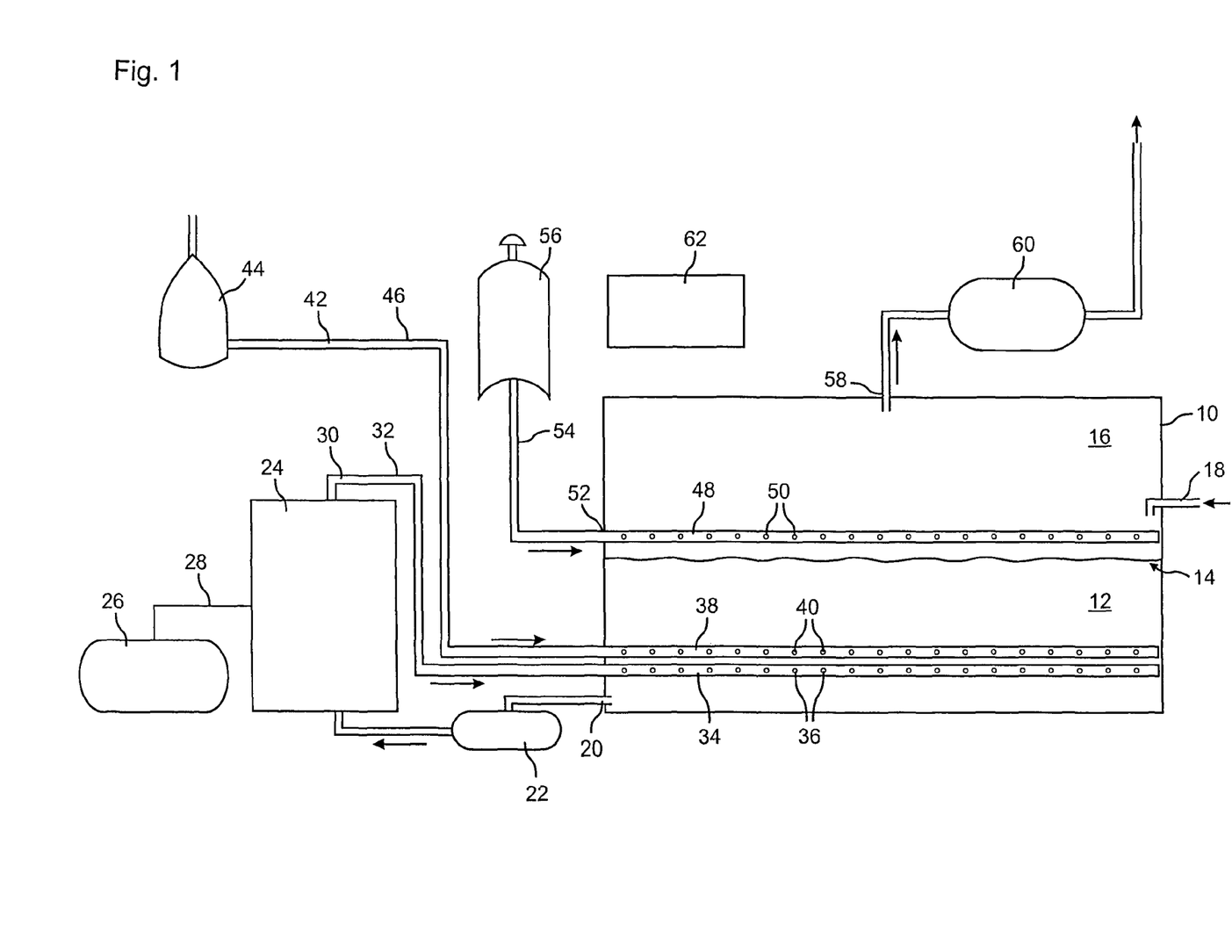
FIG. 1 shows a system for synthesizing a gas composition according to a preferred embodiment of the invention.

FIG. 1 shows an example of a system according a preferred embodiment of the invention. In this example, the system comprises a mixing chamber 10, which is adapted to accommodate water 12. In particular, the mixing chamber 10 is partly filled with the water 12. Above the water surface 14, a mixing volume 16 is provided for mixing components of the gas to be synthesized. This mixing volume 16 is filled with gas. In the example of FIG. 1, a water inlet 18 is provided for filling or refilling the mixing chamber 10 with water. Preferably, the water inlet 18 is provided for keeping the water level substantially constant, when water is discharged via a water outlet 20 provided in the mixing chamber 10. Keeping the filling level substantially constant allows a continuous operation of the system.

In the example shown in FIG. 1, water is discharged from the mixing chamber 10 via the water outlet 20. Preferably, a water pump 22 is provided for pumping water from the mixing chamber 10 to an electrolyzing chamber 24, such that the electrolyzing chamber 24 is at least partly filled with water. Electrodes are arranged inside the electrolyzing chamber 24 for electrolyzing the water. An electric power supply 26 provides the required electric power for the electrolysis. Preferably, the electric power supply 26 provides a DC current or a DC voltage, which is transmitted to the electrodes inside the electrolyzing chamber 24 via a power/current line 28. In one example, a DC voltage in the range of about 1V to about 30V may be applied to the electrodes. Preferably, the electrodes comprise high grade steel. In particular, the electrodes may be formed as plates, which preferably comprise or consist of high grade steel. However, other electrically conductive materials, that are preferably non-magnetic, may be provided for the electrodes as well (e.g. zinc).

Through the electrolysis of the water in the electrolyzing chamber 24 a primary gas 30 generated. Preferably, an electrolyte (such as sodium carbonate) is dissolved in the water. The overall gaseous product of the electrolysis is collected as the primary gas 30 and piped from the electrolyzing chamber 24 to the mixing chamber 10 via a primary supply line 32. In the example of FIG. 1, the system comprises a primary feedings pipe 34 arranged inside the mixing chamber 10 in a region below the water surface 14. The primary feeding pine 34 has a plurality of primary dispersion holes 36, such that the primary gas 32 supplied to the primary feeding pipe 34 via the primary supply line 32 is discharged into the water 12 through the plurality of primary dispersion holes 36. In FIG. 1 only one primary feeding pipe 34 is shown. In a preferred example, a plurality of primary feeding pipes 34 may be provided, which are supplied with the primary gas 30 via the primary supply line 32.

In the example of FIG. 1, a secondary feeding pipe 38 is arranged inside the mixing chamber 10 in a region below the water surface 14, preferably in the vicinity of the primary feeding pipe 34. Preferably, the secondary feeding pipe 38 extends substantially parallel to the primary feeding pipe 34. Analogous to the primary feeding pipe 34, the secondary feeding pipe 38 may be provided with a plurality of secondary dispersion holes 40, such that a secondary gas 42 supplied to the secondary feeding pipe 38 is discharged into the water 12 through the plurality of secondary dispersion holes 40. The secondary gas 42 comprises a combustible gaseous hydrocarbon, such as methane and/or ethane and/or propane and/or butane. The secondary gas 42 is provided from a secondary gas source 44, such as a gas cylinder or a pump, and piped to the mixing chamber 10, particularly to the secondary feeding pipe 38 via a secondary supply line 46. In FIG. 1 only one secondary feeding pipe 38 is shown. In a preferred example, a plurality of secondary feeding pipes 38 may be provided, which are supplied with the secondary gas 42 via the secondary supply line 46. Preferably, the number of secondary feeding pipes 38 is identical to the number of primary feeding pipes 34, wherein each of the secondary feeding pipes 38 is arranged in the vicinity of one of the primary feeding pipes 34.

Moreover, as in the example shown in FIG. 1 the system may comprise an air feeding pipe 48 arranged in the mixing chamber 10. In a preferred embodiment, the air feeding pipe 48 is arranged in a region above the water surface 14. In other examples, however, which may otherwise be construed analogous to the examples shown in the figures described herein, the air feeding pipe 48 may be arranged in a region below the water surface 14, particularly, in the vicinity of the primary feeding pipe 34 and/or the secondary feeding pipe 38. Preferably analogous to the primary feeding pipe 34 and/or the secondary feeding pipe 38, the air feeding pipe 48 may be provided with a plurality of air dispersion holes 50, such that air supplied to the air feeding pipe 48 is discharged into the mixing chamber 10 through the plurality of air dispersion holes 50. The provision of the feeding pipes 34, 38, 48 with a plurality of respective dispersion holes 36, 40, 50 ensures an efficient dispersion and mixing of the gas components.

The air is supplied to the air feeding pipe 48 via an air supply connection 52 of the mixing chamber 10. The air is piped to the mixing chamber 10 via an air supply line 54 from an air source. The air source may comprise a compressor or air pump 56 which pumps ambient air through the air supply line 54 to the mixing chamber 10. In FIG. 1 only one air feeding pipe 48 is shown. In a preferred example, a plurality of air feeding pipes 48 may be provided, which are supplied with the air via the air supply line 54. Preferably, the number of air feeding pipes 48 is identical to the number of primary feeding pipes 34 and/or the number of secondary feeding pipes 38.

In the example of FIG. 1, small gas bubbles of primary and/or secondary gas that reach the water surface 14 are further mixed with air blown through the air dispersion holes 50 into the mixing volume 16. Thereby, a combustible gas composition according to the invention forms in the mixing volume 16. The gas components may be mixed with a ratio of $x_p:x_s:x_a$, wherein $x_p$ (part of primary gas) is in the range of about 0.030 to about 0.035, $x_s$ (part of secondary gas) is in the range of about 0.009 to about 0.021, and $x_a$ (part of air) is in the range of about 0.961 to about 0.944. This combustible gas composition synthesized according to the invention may be discharged from the mixing chamber 10 via a gas outlet 58 of the mixing chamber 10. In one example, the system comprises a gas compressor 60 for transferring the combustible gas composition to a consumer and/or to a gas storage, such as a container for pressurized gas. In well-matched systems with a substantially constant or continuous consumption of the combustible gas composition, the gas may be transferred to the consumer due to a slight overpressure in the mixing chamber 10 without requiring gas pump or gas compressor 60.

The combustible gas composition according to the invention may be used as combustion gas for heating or cooking, for example, or for absorber cooling, or as fuel in a combustion engine. Preferably, the process of synthesis, particularly the pressure and/or the gas flow of the individual gas components fed to the mixing chamber 10, is controlled by a control unit 62 of the system so as to preferably ensure a continuous and stable process of synthesizing a combustible gas composition according to the invention. In particular, gas flow measure units and/or pressure gauges and/or gas valves may be provided in each of the supply lines 32, 46, 54, for example, wherein at least some of the values may be controlled automatically by the control unit 62. Preferably, the gas components are provided in the supply lines with a temperature and a pressure near standard condition, i.e. the temperature may be close to room temperature, wherein the temperature of the primary gas may be slightly elevated to the electrolyzing process in the electrolyzing chamber 24. The pressure of the gas components in the supply lines may be close to the atmospheric pressure, preferably not more than about $25 \cdot 10^3$ Pa above the atmospheric pressure.

Figure 2:
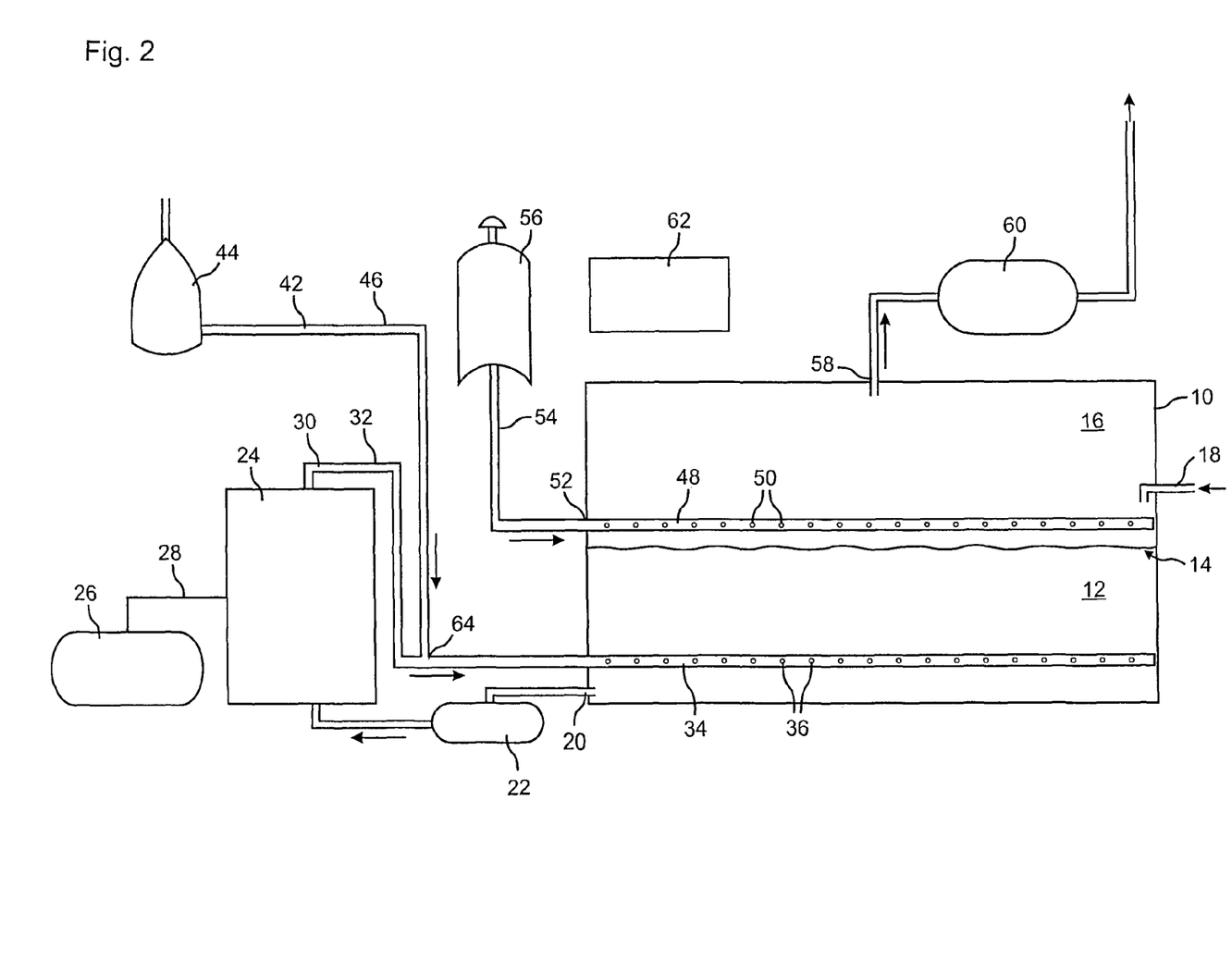
FIG. 2 shows a system for synthesizing a gas composition according to another preferred embodiment of the invention.

FIG. 2 shows another example of a system according a preferred embodiment of the invention. Many components of this system may be considered to be analogous to the example shown in FIG. 1. Thus, analogous components have the same reference numerals assigned thereto. For a detailed explanation of these components reference is made to the respective description of FIG. 1. Unlike the example of FIG. 1, however, in the example of FIG. 2 the primary gas 30 and the secondary gas 42 are fed to the mixing chamber 10 together, in a common feeding pipe 34, which may be construed and arranged analogous to the primary feeding pipe 34 described in connection with FIG. 1. In particular, in the example of FIG. 2, the primary gas 30 and the secondary gas 42 are brought together at a combining section 64 of the gas feeding system exterior to the mixing chamber 10.

Figure 3:
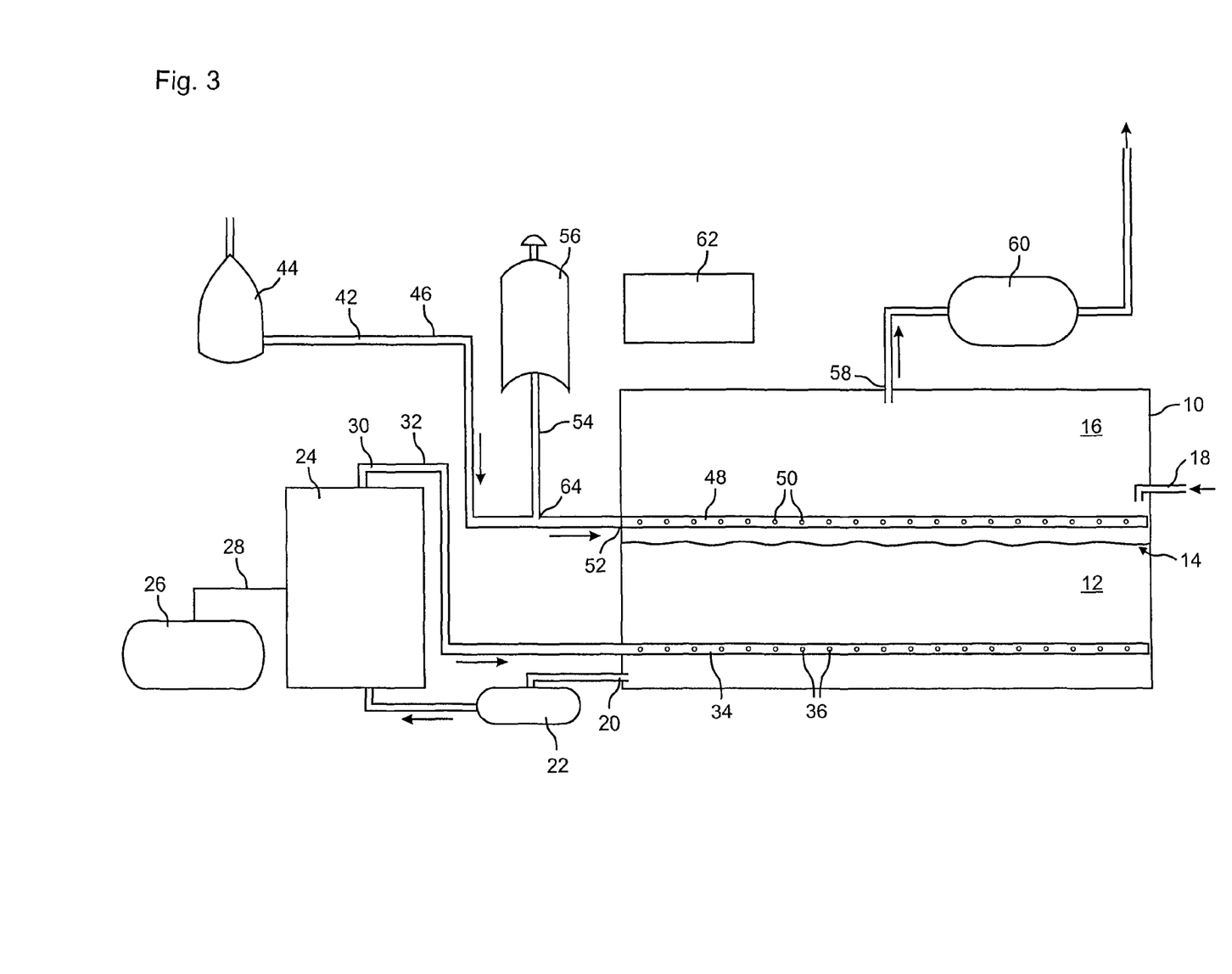
FIG. 3 shows a system for synthesizing a gas composition according to yet another preferred embodiment of the invention.

FIG. 3 shows yet another example of a system according a preferred embodiment of the invention. Many components of this system may be considered to be analogous to the examples shown in FIGS. 1 and 2. Thus, analogous components have the same reference numerals assigned thereto. For a detailed explanation of these components reference is made to the respective description above. Unlike the examples of FIGS. 1 and 2, however, in the example of FIG. 3 the secondary gas 42 and the air are fed to the mixing chamber 10 together, in a common feeding pipe 48, which may be construed and arranged analogous to the air feeding pipe 48 described in connection with FIG. 1. In particular, in the example of FIG. 3, the secondary gas 42 and the air are brought together at a combining section 64 of the gas feeding system exterior to the mixing chamber 10.

In yet another example, the air may be brought together with the primary gas 30 and/or the secondary gas 42 exterior to the mixing chamber and may be fed to the mixing chamber together with the primary gas and/or the secondary gas, preferably via a feeding pipe analogous to the primary feeding pipe 34 described in connection with FIG. 1, for example.

Figure 4:
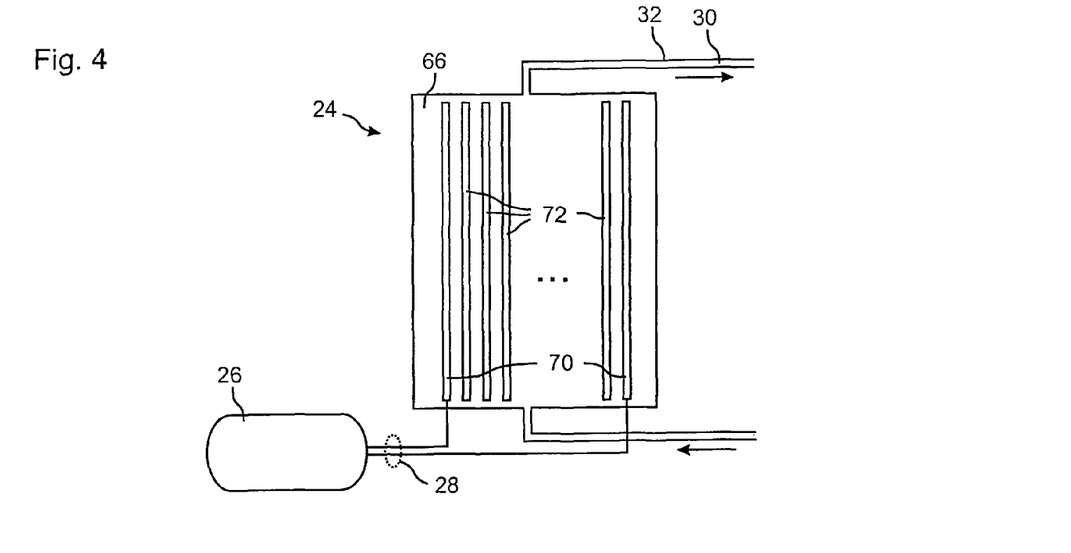
FIG. 4 shows an example of an electrolyzing chamber that may be applied in connection with a preferred embodiment of the invention

FIG. 4 shows an example of an electrolyzing chamber 24 that may be applied in connection with a preferred embodiment of the invention, such as one or more of the preferred embodiments described in connection with FIGS. 1 to 3. In the example of FIG. 4, the electrolyzing chamber 24 comprises a single electrolyzing cell 66. A plurality of electrodes are arranged inside the electrolyzing cell 66 for electrolyzing the water. Preferably, the plurality of electrodes comprise at least two main electrodes 70 and one or more auxiliary electrodes 72, wherein only the main electrodes 70 electrically connected to the electric power supply 26 via the power/current line 28, while the one or more auxiliary electrodes 72 are arranged between the main electrodes 70. The auxiliary electrodes are not electrically connected to the electric power supply 26, i.e. preferably, the auxiliary electrodes are electrically floating. The main electrodes 70 and the auxiliary electrodes 72 may be made of the same electrically conductive material, such as high grade steel.

In a preferred embodiment the auxiliary electrodes 72 are arranged between the main electrodes 70 so as to form equal distances (spacings) between adjacent electrodes. A number of (n−1) auxiliary electrodes 72 results in a number of n spacings between adjacent electrodes. For example, a combination of two main electrodes 70 and 13 auxiliary electrodes 72 results in 14 spacings between adjacent electrodes. In a particularly preferred embodiment, the number (n−1) of auxiliary electrodes 72 is selected such that $n \cdot \Delta V = V$, wherein V is the voltage applied to the main electrodes 70 and $\Delta V$ is in the range of about 1.7 V and about 2 V. For example, in case of applying 15 electrodes (2 main electrodes and 13 auxiliary electrodes) a DC voltage of about 26 V may be applied, which results in a mean value slightly below 2V for the voltage that drops between adjacent electrodes. A voltage drop slightly below 2V between adjacent electrodes is preferred due to the achieve high efficiency of gas production and a low loss of parasitic power. The distance between adjacent electrodes may be in the range of several millimeters, such 2 to 3 mm, for example. However, smaller or larger distances can be applied alternatively. The electrodes may be provided as parallel metal plates with a diameter of several tens of centimeter, for example. However, smaller or larger electrodes may be applied alternatively, depending on the desired amount of primary gas 30. As already described above, the overall gaseous product of the electrolysis in the electrolyzing cell 66 is collected as the primary gas 30 and piped from the electrolyzing chamber 24 to the mixing chamber via the primary supply line 32.

Figure 5:
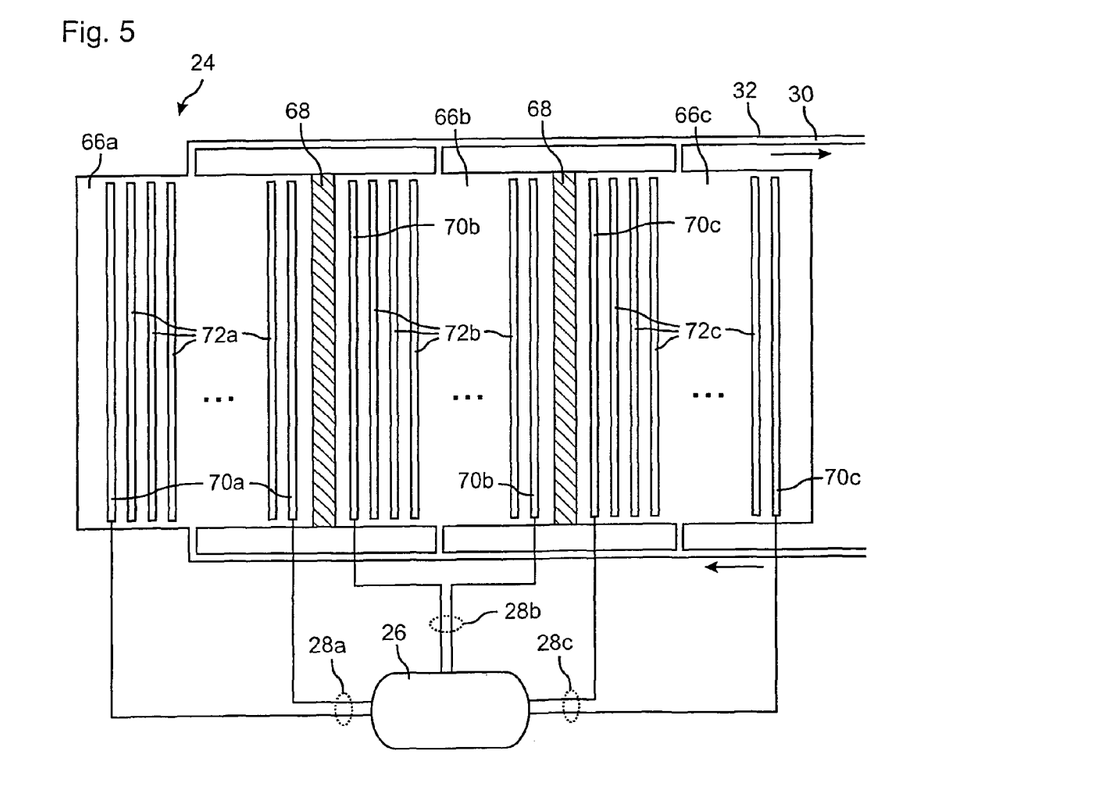
FIG. 5 shows another example of an electrolyzing chamber that may be applied in connection with a preferred embodiment of the invention.

FIG. 5 shows another example of an electrolyzing chamber 24 that may be applied in connection with a preferred embodiment of the invention, such as one or more of the preferred embodiments described in connection with FIGS. 1 to 3. In the example of FIG. 5, the electrolyzing chamber 24 comprises a plurality of electrolyzing cells 66a, 66b, 66c. Preferably, each of the plurality of electrolyzing cells 66a, 66b, 66c according to this example (including the electrode arrangements provided in the electrolyzing cells) may be arranged and may work analogous to the electrolyzing cell 66 described in connection with FIG. 4 example shown in FIG. 1. Thus, analogous components have analogous reference numerals assigned thereto, where the respective components in the example of FIG. 5 have the additional letter "a", "b" or "c" attached to the respective reference numeral. For a detailed explanation of these components, reference is made to the respective description of FIG. 4. In the example of the FIG. 5, the individual electrolyzing cells 66a, 66b, 66c are preferably separated from each other by cell separation walls 68, which preferably prevent an, exchange of water and primary gas between the individual electrolyzing cells. Preferably, the cell separation walls 68 are electrically isolating. For example, polyurethan and/or polyvinyl chloride may be applied for the cell separation walls 68.

With an electrolyzing chamber 24 as described in connection with FIGS. 4 and 5, an amount of primary gas 30 may be produced that corresponds to an amount of the synthesized combustible gas composition in the range of about 10 m$^3$ to about 50 m$^3$ per hour, for example. However, dependent on the size of the electrolyzing chamber as well as the size and the number of electrodes and the applied electric power, even a significantly higher or lower amount of primary gas may be produced.

Measurements of the fuel value of combustible gas compositions obtained with the above described preferred systems resulted in a value of about 1.1 kWh/m$^3$ (calculate based on analytic values according to DIN 51872-4). After storage of the combustible gas composition for one year at a pressure of about 2-3 atm (about 2-3·10$^5$ Pa), no degradation of the combustible gas composition was observed. Moreover, the combustible gas composition according to the invention is very safe in view of its low tendency of spontaneous combustion and flashback. For example, when applying the combustible gas composition in a diesel engine, a compression ratio of 1:20 was achieve without self-ignition of the gas composition.

As compared to typical conventional combustible gases, the combustible gas composition according to the present invention is a relative thin gas composition, which already includes the optimal amount of combustion air. It is (electrically) ignitable only in gas burners or under high pressure (e.g. combustion engine). Escaping gas composition in contact with ambient air is not easily ignitable and does not explode even in the presence of an open flame of a gas lighter, for example. Thus, handing the combustible gas composition according to the present invention is safe, since the danger of explosion is very low in case of a gas leakage into the ambient air. Moreover, due to the high fraction of oxygen in the gas composition according to the invention, there exist no heath hazard, neither from the gas composition itself nor from the combustion products. Both the gas composition itself and the exhaust-gas (the gas product of a combustion of the gas composition) can be inhaled without health hazard. The exhaust gas contains about 7.5 percent (volume) of oxygen. Moreover, it has been observed that a combustible gas composition according to the invention is very safe against flashbacks, which may otherwise occur in burner systems or in combustion engines.

Thus, the present invention provides a combustible gas composition that is efficient and safe for storing energy, such as energy obtained from solar energy and/or from wind energy and/or from water energy. It is particularly useful for isolated application without requiring intense security measures. Moreover, it is useful for heating systems and for gas burners in an absorber cooling system as well as in combustion engines in vehicles or electric power generators. For example, a combustible gas composition according to the invention can be very efficiently applied as fuel in modified diesel engine (with a compression ratio of about 1:20) with added spark plugs (since no self-ignition occurs with the gas composition of the invention). For burning the combustible gas composition, it is preferred to use a burner that comprises a gas cavity covered by fine-meshed metal, such as tungsten for example, where the combustible gas composition is supplied to the burner through a gas supply connection leading into the gas cavity. The combustible gas composition is burned where it leaves the gas cavity though the fine metal mesh. Since the combustible gas composition already contains all gas components required for burning the gas (e.g. oxygen), no ambient air is required for burning the combustible gas composition. Thus, contrary to conventional burners, it is preferred that no ambient air enters the gas cavity of the burner while burning the combustible gas composition.

LIST OF REFERENCE NUMERALS 10 mixing chamber
12 water
14 water surface
16 mixing volume
18 water inlet
20 water outlet
22 water pump
24 electrolyzing chamber
26 power supply
28 power/current line
30 primary gas
32 primary supply line
34 primary feeding pipe
36 primary dispersion holes
38 secondary feeding pipe
40 secondary dispersion holes
42 secondary gas
44 secondary gas source
46 secondary supply line
48 air feeding pipe
50 air dispersion holes
52 air supply connection
54 air supply line
56 air pump
58 gas outlet
60 gas compressor
62 control unit
64 combining section
66, 66a, 66b, 66c electrolyzing cells
68 cell separation walls
70, 70a, 70b, 70c main electrodes
72, 72a, 72b, 72c auxiliary electrodes

The invention claimed is:
1. A method for synthesizing a combustible gas composition, the method comprising:
providing a primary gas obtained by electrolyzing water; and
mixing the primary gas with a secondary gas and with air with a ratio of xp:xs: xa, wherein xp is in the range of about 0.02 to about 0.06, xs is in the range of about 0.01 to about 0.04, and xa is in the range of about 0.9 to about 0.97, the mixing including:
providing a mixing chamber partly filled with water;
providing the primary gas in the water within the mixing chamber, including feeding the primary gas from outside the mixing chamber into the water inside the mixing chamber via a primary feeding pipe arranged in the water inside the mixing chamber; and feeding the air into the mixing chamber in the room above the water, wherein the secondary gas comprises a combustible gaseous hydrocarbon.

2. The method of claim 1, comprising discharging water from the mixing chamber into an electrolyzing chamber, wherein the primary gas is generated by electrolyzing the water inside the electrolyzing chamber.

3. The method of claim 1, wherein feeding the air into the mixing chamber in the room above the water comprises:

bringing the secondary gas and the air together outside the mixing chamber and feeding the secondary gas together with the air from outside the mixing chamber into the mixing chamber in the room above the water via an air feeding pipe.

4. The method of claim 1, wherein the primary gas is generated by electrolyzing the water inside the mixing chamber.

5. The method of claim 1, wherein providing the secondary gas in the water within the mixing chamber comprises feeding the secondary gas from outside the mixing chamber into the water inside the mixing chamber via a secondary feeding pipe arranged in the water inside the mixing chamber.

6. The method of claim 1, wherein the primary gas is provided by electrolyzing the water by applying a direct current to electrodes arranged in the water.

7. The method of claim 1, further comprising adding an electrolyte to the water.

* * * * *